United States Patent [19]

Langston

[11] Patent Number: 4,814,562

[45] Date of Patent: Mar. 21, 1989

[54] ELECTRO-OPTIC FORCE AND PRESSURE TRANSDUCER AND SENSOR

[75] Inventor: Marcus C. Langston, Fayettville, Ark.

[73] Assignee: University of Arkansas, Ark.

[21] Appl. No.: 119,952

[22] Filed: Nov. 13, 1987

[51] Int. Cl.[4] .......................... G01D 5/30; B25J 15/02
[52] U.S. Cl. ................................. 250/227; 250/231 P; 901/33
[58] Field of Search ............. 250/227, 231 R, 231 P; 73/705, 862.04; 350/96.1; 901/33

[56] References Cited

U.S. PATENT DOCUMENTS 4,488,040 12/1984 Rowe ................................. 250/227
4,560,016 12/1985 Ibanez et al. ...................... 250/227
4,618,764 10/1986 Harmer ........................... 250/231 R
4,692,610 9/1987 Szuchy ............................ 250/231 P Primary Examiner—David C. Nelms
Assistant Examiner—Stephone B. Allen
Attorney, Agent, or Firm—Hill, Van Santen, Steadman & Simpson

[57] ABSTRACT

A pressure sensor includes at least one light conducting opening extending generally parallel to a pressure receiving face of a deformable body and a light emitting and a light receiving device at opposite ends of the light transmitting opening. A cross sectional area of the light transmitting opening, and correspondingly the light transmitting capability of the opening, vary in response to changing pressures applied to the pressure receiving face, which is determined by the light receiver. A measuring circuit for the light receiver is also provided.

17 Claims, 2 Drawing Sheets

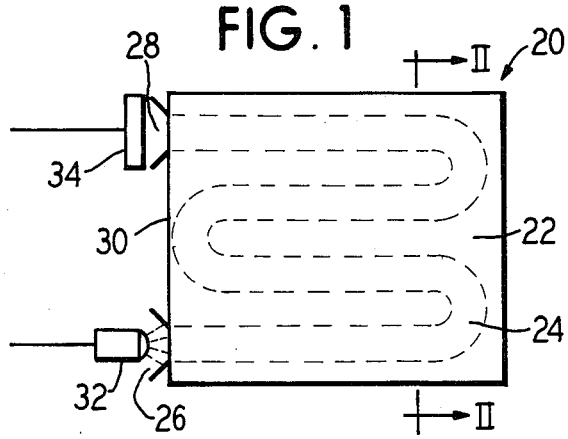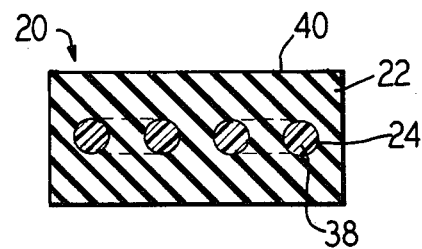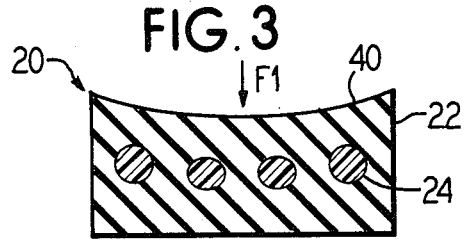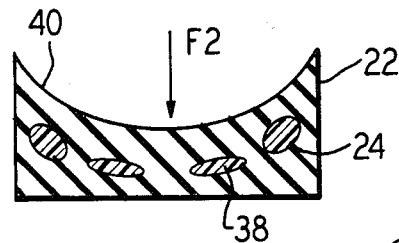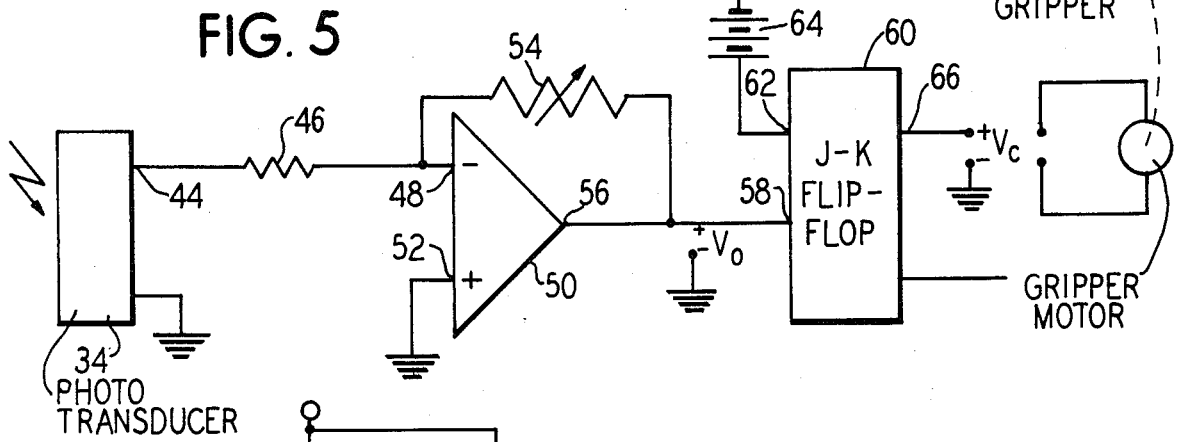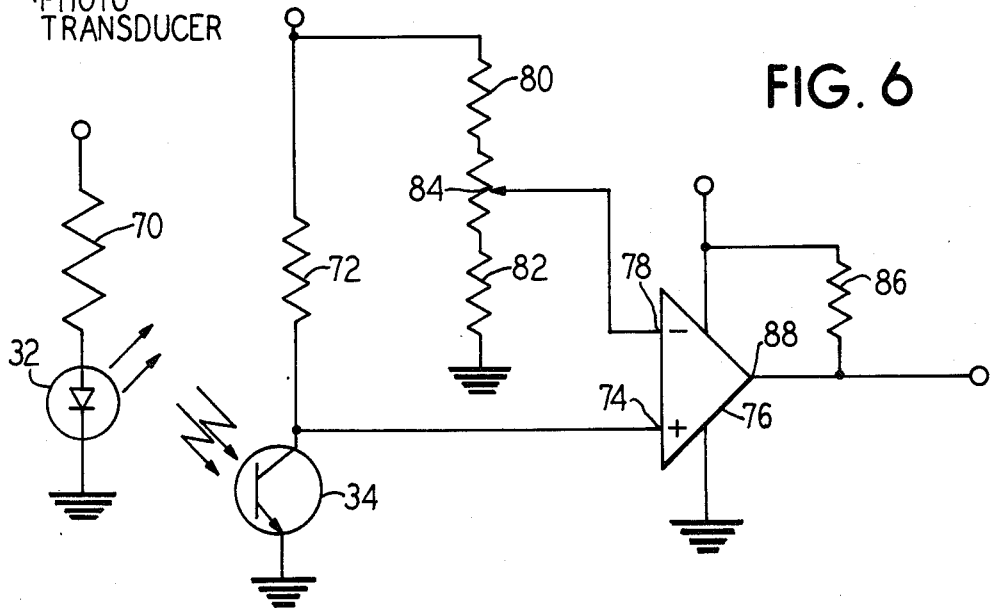

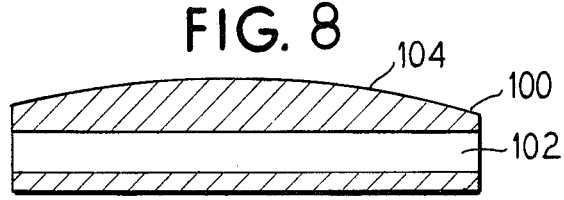
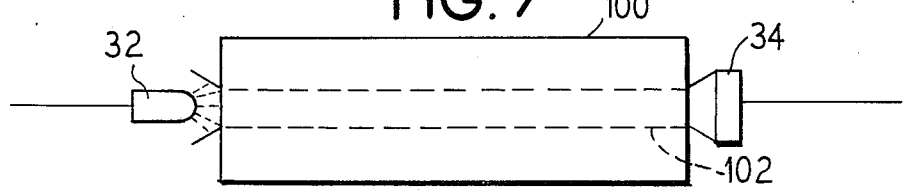
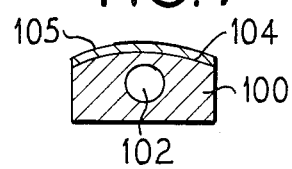 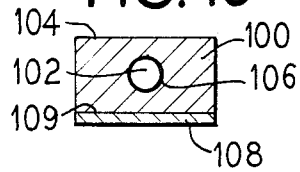
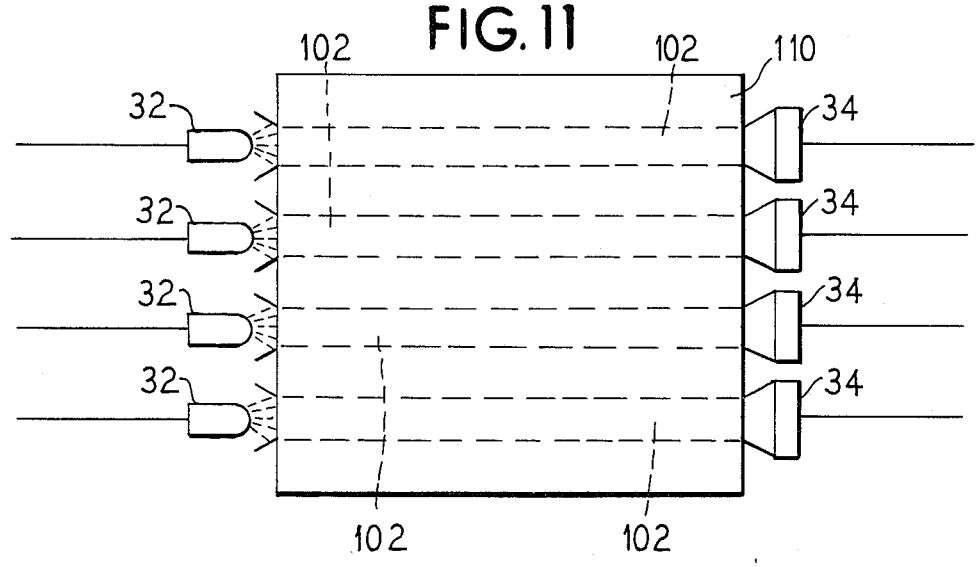

4,814,562

ELECTRO-OPTIC FORCE AND PRESSURE TRANSDUCER AND SENSOR

BACKGROUND OF THE INVENTION

1. Field of the Invention

The present invention relates generally to a pressure sensor and, more specifically, to a deformable body having a transversely extending deformable light transmitter with means for detecting variations in the light transmitted.

2. Description of the Related Art

Piezoelectric sensors, optic devices, and strain gages are currently used in some pressure sensing applications, such as for tactile sensors in robot technology. Such sensors, however, generally are quite costly, require close calibration and are often influenced by environmental factors such as electric noise or temperature fluctuations encountered in a manufacturing environment.

SUMMARY OF THE INVENTION

A tactile or touch sensor provides analog feedback to a robot controller on the amount of gripping pressure that is exerted on an object. The sensor operates on the principle that a through opening in an elastic material will vary as a function of the compression force applied to the material, the variations in turn, controlling the quantum of light passing through the opening and generating a controlling variable signal.

For example, at least one light conducting opening extends generally parallel to a pressure receiving face of a deformable body, such as a simple bore or fiber optic devices. A photo emitter transmits light into one end of the light conducting opening, and a photo-transducer detects the light transmitted through the light conducting opening at the other end of the opening.

As pressure is applied to the pressure receiving face of the deformable body, the cross section of the light conducting opening changes so that the quantity of light transmitted therethrough varies generally proportionally to the quantity of force applied to the pressure receiving face. A measuring device is connected to an output of the photo-transducer to measure the variations in the light received by the photo-transducer. The measuring device either provides a signal representative of the force applied to the pressure receiving face, or provides an indication that the force has reached a predetermined threshold level.

Although the present pressure sensor is particularly useful as a tactile sensor in a robotic gripper, its use is also foreseen in a variety of other pressure sensing applications, including as an inexpensive weight scale, an environmental pressure indicator, or as a contact sensor in an automated work environment. The device is inexpensive, reliable, immune to environmental effects, and can be formed as a compact unit.

BRIEF DESCRIPTION OF THE DRAWINGS

FIG. 1 is a plan view of a pressure sensor according to the principles of the present invention;

FIG. 2 is a cross section along line II—II of FIG. 1;

FIG. 3 is a cross section of the pressure sensor of FIG. 1 with a relatively small force applied;

FIG. 4 is a cross section of the pressure sensor of FIG. 1 with a relatively large force applied;

FIG. 5 is a circuit diagram of a measuring circuit for use with the pressure sensor of FIG. 1;

FIG. 6 is a circuit diagram of a second embodiment of a measuring circuit for use in the present invention;

FIG. 7 is a plan view of a second embodiment of the pressure sensor of the invention;

FIG. 8 is a longitudinal cross section of the pressure sensor of FIG. 7;

FIG. 9 is a transverse cross section of the pressure sensor similar to the embodiment of FIG. 7;

FIG. 10 is a transverse cross section of a further embodiment of the pressure sensor; and FIG. 11 is a plan view of yet a further embodiment of a pressure sensor of the invention.

DESCRIPTION OF THE PREFERRED EMBODIMENTS

While the principles of the present invention are of wide utility wherever pressure sensing is necessary or desirable, a particularly useful application of the principles of the present invention is made in the robot gripper of the type currently used in tactile sensor technology. Thus, referring to the exemplary embodiment which illustrates the principles of the invention a pressure sensor 20 is shown in FIG. 1 including a body 22 of deformable elastic or resilient material having a through opening 24 formed there within. In this embodiment, the opening 24 includes a first end or inlet 26 and a second end or outlet 28 opening out of the same side 30 of the deformable body 22. At the first end 26 of the opening 24 is mounted a photo emitter 32 for directing rays of light into the opening or inlet 24. A photo sensor, or photo-transducer, 34 is mounted at the second end or outlet 28 of the opening 24 to receive any light transmitted between the inlet and the outlet through the opening 24. The opening 24 need not be a straight line linear opening but may be non-linear. For example, illustrated example, the opening 24 has generally an "S" configuration provided multiple longitudinally extended passes through the deformable body 22 between the laterally offset inlet and outlet.

In FIG. 2, the deformable body 22 is shown in cross section. An elastic material such as rubber or foam rubber may be conveniently employed having a durometer of predetermined value. If the opening 24 is other than a straight linear opening, it may be advantageous to utilize a light guide 38 such as a fiber-optic cable or other light conductor, such as a light reflecting tubing. The pressure sensor of FIG. 2 has a pressure receiving surface, or face, 40 which is generally parallel to the longitudinal axis of the body and the opening 24. In FIG. 2, no appreciable pressure is applied to the pressure receiving face 40 so that the light transmitting opening 24, and correspondingly the light guide 38, has its greatest cross-sectional area, in this instance, a round cross section. Of course, other shapes of selected cross sections for the opening 24 are also possible without departing from the spirit of the invention.

In FIG. 3, a force Fl is applied to the force receiving face 40 of the pressure sensor 20. The force receiving face 40 is depressed, causing the elastic body 22 to deform. Similarly, the light conducting opening 24 with the light guide or conductor 38 therewithin is deformed by the force Fl. As the light guide or conductor 38 deforms, the cross section thereof is reduced as a function of the compressive force. For example, a round cross section becomes more oval and the cross sectional area decreases, reducing the light conducting capability of the opening 24 and/or the light guide or conductor 38.

In FIG. 4, a relatively larger force F2 is shown applied to the force receiving face 40 of the deformable body 22, causing the opening 24 and/or the light guide or conductor 38 to be further reduced by assuming an even more flattened cross section. The cross-sectional area of the opening 24 and/or the flattened guide or conductor 38 is less then that shown in FIG. 3. The change in cross-sectional area of the opening 24, and correspondingly the light guide 38, is approximately proportional to the amplitude of the force applied to the force receiving face 40 of the deformable body 22. As the cross-sectional area of the opening 24 and/or light guide or conductor 38 changes, so does its light carrying capacity so that light transmitted through the opening 24 and/or the light guide or conductor 38 varies generally proportionally to the force on the body 22 of the pressure sensor 20.

In FIG. 5, a first embodiment of a measuring circuit includes the photo-transducer 34 which receives light that has been conducted through the light transmitting opening 24 and which varies with the amplitude of force on the force receiving face 40 of the deformable body 22. A signal proportional to the quantity of light striking the photo-transducer 34 is output on an output lead 44. The signal is carried through an input impedance resistor 46 to an inverting input 48 of an operational amplifier 50. A non-inverting input 52 of the operational amplifier is connected to ground. Negative feedback is provided by a variable resistor 54 connecting an output 56 of the operational amplifier 50 to the inverting input 48. The output lead 56 from the operational amplifier is connected to a clock input 58 of a J-K flip-flop 60, the J input 62 being connected to a constant DC voltage, such as from a battery 64. An output signal from the J-K flip-flop 60 is provided at an output lead 66.

In operation, the circuit of FIG. 5 has a very small voltage at the output lead 44 of the photo-transducer 34 which is inversely proportional to the amplitude of the force applied to the pressure sensor 20, for example, the voltage may be in the range of a few microvolts. The small output signal is inverted and amplified by the operational amplifier 50 to produce an output voltage $V_O$ which is supplied to the input 58 of the J-K flip flop 60. When the amplifier output voltage $V_O$ reaches an amplitude of approximately 2.8 volts, for example, the J-K flip flop 60 changes state and transmits a control signal $V_C$ on the lead 66. The threshold voltage level which triggers the flip flop 60 depends upon the gripping pressure desired. The control voltage $V_C$ indicates the presence of a pressure greater than a predetermined threshold at the pressure sensor 20. The amplitude of this predetermined pressure can be varied by adjusting the variable resistor 54 so that the control voltage $V_C$ changes state at different threshold pressures.

The pressure sensor 20 may be used as a tactile sensor in a robot gripper and the control voltage $V_C$ is used to stop a gripper motor operating connected to a gripper when a desired gripper pressure is reached, as shown schematically in FIG. 5.

In FIG. 6, a second preferred embodiment of a measuring circuit is shown including an LED light source 32 in series with a voltage dropping resistor 70. The LED 32, which may be either in the infrared or visible light ranges, is mounted at the first end 26 of the opening 24. In the preferred embodiment, the light transducer 34 is a phototransistor having a collector connected to a 5 volt supply through a resistor 72. The collector of the phototransistor 34 is also connected to a non-inverting input 74 of an operational amplifier 76. An inverting input 78 of the operational amplifier 76 is connected to a voltage divider network formed by fixed resistors 80 and 82 and by a variable tap resistor 84.

The operational amplifier 76 is operated as a comparator and includes a pull-up resistor 86 at an output 88. The output signal of the operational amplifier, or comparator, 76 changes state as the phototransistor 34 signal reaches the voltage threshold established by the voltage divider network at inverting input 78. Like the previous circuit, the amplitude of the force at which the circuit is triggered is variable, in this case by the manipulation of the variable resistor 84.

In operation, the preferred measuring circuit of FIG. 6 generates a light beam at the LED-resistor combination 32,70, which is transmitted through an opening 24 in the pressure sensor 20. The light beam is received, after being varied by forces on the pressure sensor 20, by the phototransistor 34. As the light striking the base portion of the phototransducer 34 varies, the current flow through the collector to the emitter of the phototransistor 34 varies, which results in a correspondingly variable voltage across the resistor 72. The changing voltage is fed to the non-inverting input 74 of the comparitor unit 76, which compares the voltage to a threshold or reference level established at the inverting input 78 of the comparator by the voltage divider network of the resistors 80,82 and 84. The variable tap resistor, or potentiometer, 84 enables the reference or threshold level at the inverting input 78 to be selectively varied to a desired level. The comparator 76 operates to generate a high output signal at the output 88 when the voltage level at the input 74 exceeds the reference voltage at the input 78. When the voltage level at the input 74 falls below the reference level, the comparator 76 operates to pull the output voltage at the output 88 to a low level.

Thus, when no force or only a small force is applied to the pressure sensor, the phototransducer 34 is highly conductive so that the output voltage is low. When a larger force is applied to the pressure sensor, then the phototransducer becomes less conductive and the output voltage is switched to a high state. By adjustment of the potentiometer 84, the force level which triggers this change of state can be selectively adjusted.

Another embodiment of the invention is shown in FIG. 7, having an elongated deformable body 100 through which extends a straight linear opening 102. The light emitter 32 and the light transducer 34 are mounted at the respective opposite ends of the opening 102 to emit and, respectively, receive light conducted therethrough. Although a fiber-optic cable or other light guide or conductor can be used, for the sake of simplicity the light conducting opening 102 may be hollow and may be of any selected cross-sectional configuration.

The pressure sensor 100 may include other configurations, for example, as shown in FIG. 8 a longitudinally curved pressure receiving face 104 is provided with the curvature extending in a generally longitudinal direction. Other shapes of pressure receiving faces are also possible, depending upon the particular application of the present device. For example, a concave force receiving surface 104 may be desirable in some applications in place of the illustrated convex surface.

A further embodiment is shown in FIG. 9 in which the pressure receiving face 104 is curved laterally, for example, about an axis normal to the opening 102. If desired, a coating 105 may be applied to the pressure receiving face 104 to resist wear, and when used in a harsh or caustic environment, to resist chemical attack.

Referring now to FIG. 10, the pressure sensor may also include a reflective coating 106 on the inside walls of the light conducting opening 102. The reflective coating 106, which can be in the form of a reflective tubing disposed within the opening 102, also provides the possibility of having a curved light transmitting opening 102.

In order to selectively control the deformability of the body a reinforcing backing may be provided on the surface that lies opposite the pressure receiving face to stiffen the deformable body within desired parameters. For example, as shown in FIG. 10, a backing 108, which may be of sheet metal, plastic, or other stiff material, restricts deformation of a rear surface 109 to which it is connected or adhered so that deformation forces against the front face 104 more readily cause the opening 102 to deform within predictable limits. The reinforcing backing 108 may be required for certain applications of the present pressure sensor, depending upon the type of mounting contemplated. It is also possible to apply a stiffening member to the front face or pressure receiving face of the deformable body so that the pressure is more evenly distributed across its face. This may be useful where unevenly shaped bodies are being picked up, such as by a robotic gripper.

In another form of the invention, a plurality of light conducting openings may be provided in a single body. Thus as shown in FIG. 11, four openings 102 extending substantially parallel to one another are provided through a single deformable body 110. Each of the light conducting openings 102 includes a light emitter 32 and a light detector 34, which may have the outputs thereof connected together or to individual measuring circuits.

Although the deformable body of the present invention is disclosed as being of rubber or foam rubber, a variety of other deformable materials may be used as well. The elasticity of the choosen material depends upon the forces to be measured by the present pressure sensor and on the size of the sensor. The material of the deformable body is preferrably opaque. Although described in conjunction with analog measuring circuits, it is contemplated to apply digital signal processing techniques in a measuring circuit. Since the output of the photo-transducer 34 is generally proportional to the amplitude of force applied to the pressure receiving face of the present device, it is possible to use the present pressure sensor not only in an on-off application, but also in pressure and force measuring applications, such as weight measuring, environmental pressure sensing such as in a closed container, or for other tactile sensing applications.

The materials from which the present device is constructed are inexpensive and readily available so that an effective and efficient pressure sensor is provided at a very low cost. The device is immune to electronic noise frequently encountered in a manufacturing environment. The present pressure sensor can be manufactured on a very small scale and thereby provide a miniature tactile sensor, or can be made on a much larger scale for sensing more extreme weight and pressures over a larger area, even, for example, in a truck weighing scale.

Although other modifications and changes may be suggested by those skilled in the art, it is the intention of the inventor to embody within the patent warranted hereon all changes and modifications are reasonably and properly come within the scope of his contribution to the art.

I claim:

1. An apparatus for measuring pressure, comprising:
   a deformable elastic body having a pressure receiving surface and at least one opening extending generally parallel to and spaced form said pressure receiving surface, said at least one opening being variable in cross-sectional area in response to pressure applied to said pressure receiving surface;
   means for transmitting light through said at least one opening; and
   means for receiving light transmitted through said at least one opening, said light receiving means including signal generating means for detecting variations in said light transmitted through said at least one opening as said at least one opening varies in cross-sectional area as a function of the pressure applied to said body.

2. An apparatus as claimed in claim 1, wherein said at least one opening is a plurality of openings extending substantially parallel to one another, and including
   a like plurality of transmitting means and receiving means to detect variations in transmittal light through each of said plurality of openings as each respective opening varies in cross-sectional area.

3. An apparatus as claimed in claim 1, wherein said at least one opening extends in a straight line through said deformable body.

4. An apparatus as claimed in claim 1, further comprising:
   a reflective coating on an inside surface of said at least one opening.

5. An apparatus as claimed in claim 1, further comprising:
   a deformable light conductor extending through said at least one opening, said light conductor being deformable in cross-sectional area t ovary the quantity of light transmitted therethrough.

6. An apparatus as claimed in claim 1, further comprising:
   means for measuring variations in said transmitted light detected by said light receiving means.

7. An apparatus as claimed in claim 4 wherein said at lest one opening extends along a curved path.

8. An apparatus as claimed in claim 5, wherein said deformable light conductor extends in a generally S-shaped path generally parallel to said pressure receiving surface.

9. An apparatus as claimed in claim 6, wherein said measuring means is an electrical circuit connected to an output of said receiving means, said circuit including:
   a selectively variable amplifier having an input connected to said output of said receiving means, and
   a latch connected to an output of said amplifier.

10. An apparatus as claimed in claim 6, wherein said measuring means includes:
    a comparator having a first input connected to an output of said receiving means; and
    means for setting a threshold level at a second input of said comparator.

11. An apparatus as claimed in claim 9, wherein said selectively variable amplifier is a negative feedback amplifier having a variable feedback resistance, and said latch is a logic flip-flop having a clock input connected to said output of said amplifier.

12. An apparatus as claimed in claim 10, wherein said means for setting a threshold level is a selectively variable voltage divider.

13. A pressure sensor for use in sensing forces applied to a surface, comprising:
- a deformable body of flexible material having a pressure sensing surface, said deformable body having at least one transversely extending light conducting opening with first and second ends, said light conducting opening being of a ross-sectional area to transmit a quantity of light, said deformable body deformable in response to forces applied to said surface to vary said cross-sectional area and correspondingly vary the quantity of light transmitted by said opening;
- an LED light source mounted at said first end of said light conducting opening to transmit a light signal through said light conducting opening;
- a photo-transducer mounted at said second end of said light conducting opening to receive said light signal transmitted through said light conducting opening, and
- circuit means connected to an output of said photo-transducer for measuring for measuring variations in said light signal received by said photo-transducer as a result of pressure on said pressure sensing surface.

14. A pressure sensor as claimed in claim 13, wherein said deformable body is mountable in a robotic gripping apparatus to provide tactile sensing.

15. The method of control in response to pressure variations as a controlling variable which includes the steps of:
- directing a force along a prescribed path intersecting a deformably elastic body having at least one through opening therein having an inlet and an outlet;
- selectively changing the quantum of force so applied to correspondingly change the compressibility of the body and the cross-sectional size of the opening;
- continuously directing rays of light into the inlet;
- receiving light from the outlet in variable amounts as the cross-sectional size of the opening changes; and
- converting the light at the outlet to an electric control signal for transmission to a point of utilization.

16. A tactile-touch sensor for providing analog feedback to a controller, comprising:
- a body of elastic material through which extends an opening having a light inlet and a light outlet through which the passage of light is accommodated;
- a light source at said inlet to transmit light into said through said opening
- analog feedback means including:
- a photo-cell means at said outlet to receive light transmitted through said opening; and
- said body having a surface intersecting a force transmitting axis so that a cross-sectional area of said opening varies as a function of the force, thereby to control the quantum of light received at said photo-cell means for generating a controlling variable signal to drive the analog feedback means as a function of the variable pressure.

17. In an electro-optic force and pressure transducer and sensor, the improvement of
- a sensor body of elastic material having a light conducting opening extending therethrough between first and second spaced apart points and having an intermediate portion of a selected cross-sectional configuration of predetermined cross-sectional area,
- force applying means for engaging said body of elastic material and indenting said light conducting opening at said intermediate portion and reducing the cross-sectional area in proportion to the amount of deformation,
- and means including light sensing means for transmitting and receiving rays of light through said opening between said first and second spaced apart points to generate a control signal proportional to the reduction of cross-sectional area of said opening and hence a function of the force exerted against said sensor body.

* * * * *